ously located activating switches are required. Two

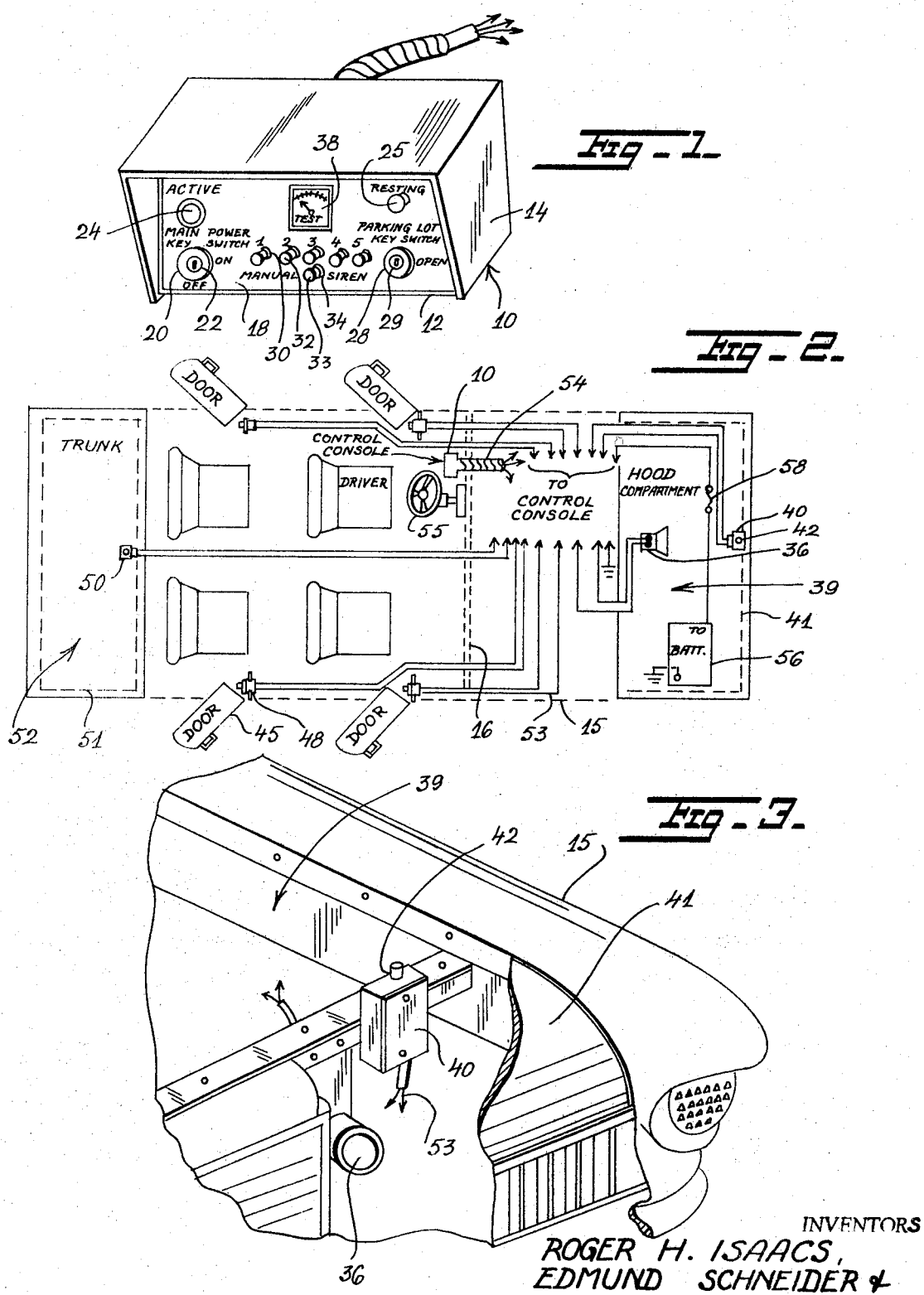

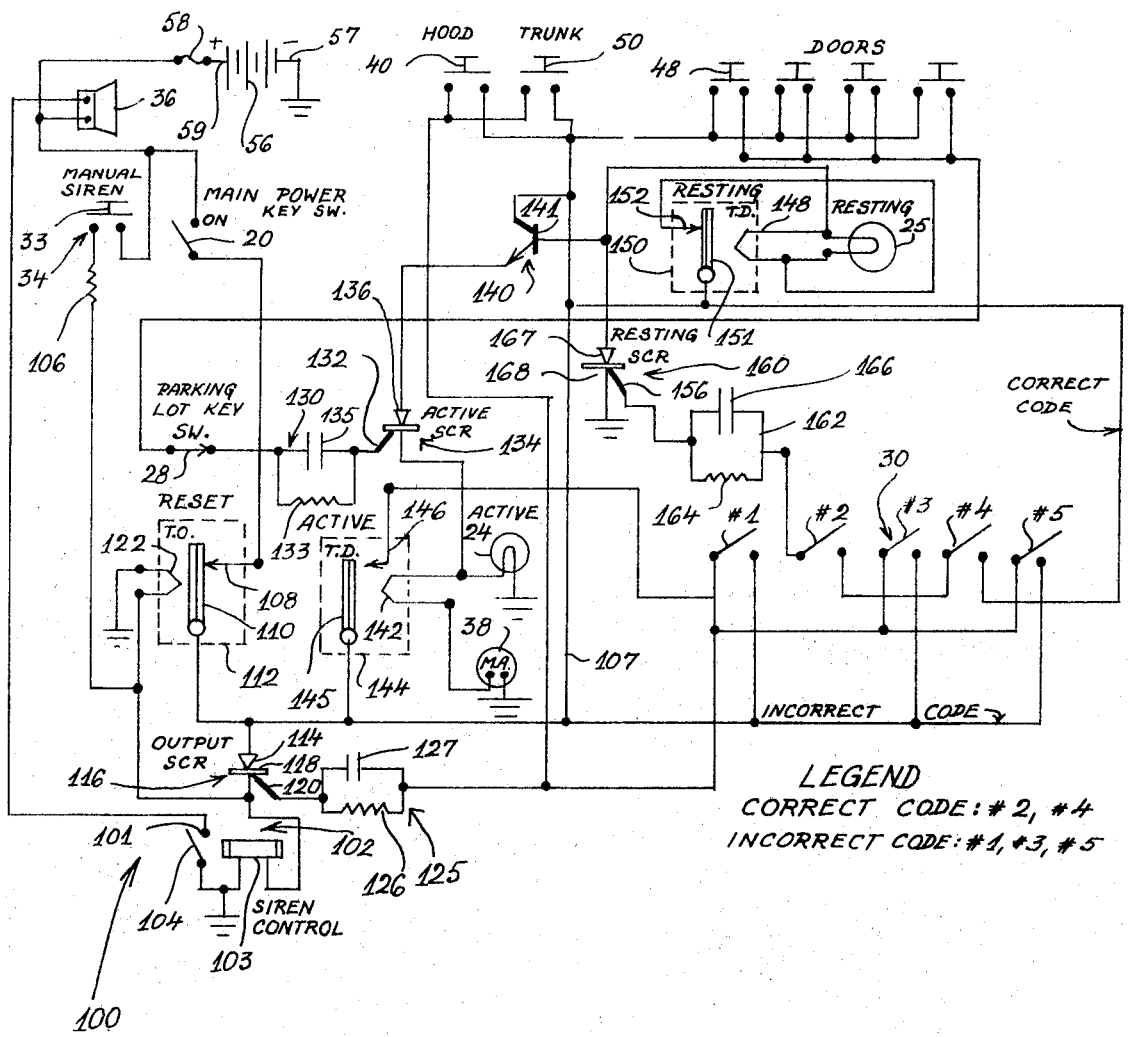

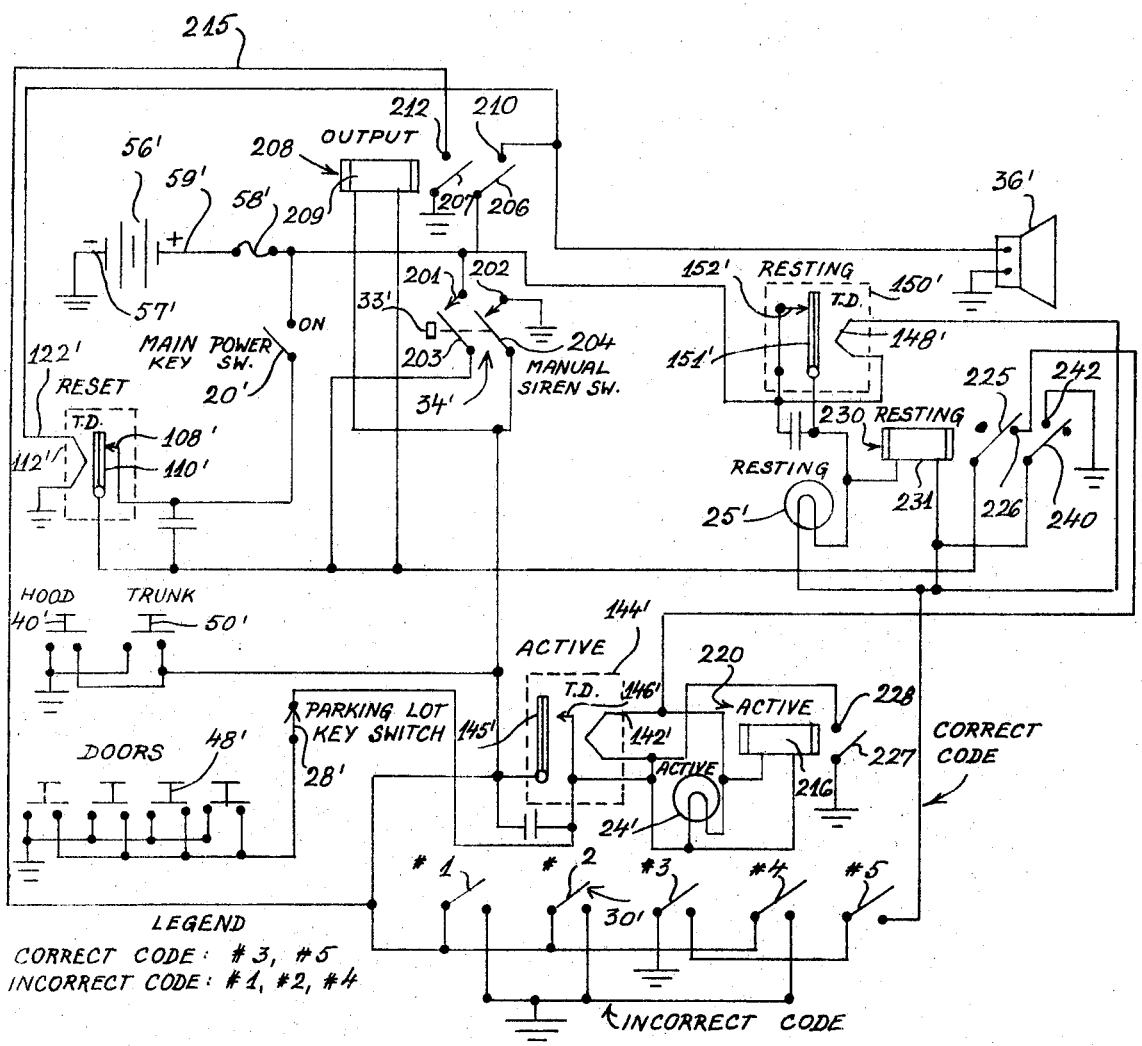

United States Patent Office 3,513,466
Patented May 19, 1970

3,513,466
PROTECTIVE ALARM SYSTEM
Roger H. Isaacs and Edmund Schneider, 499 E. 8th St. 11218; and Wallace S. Levine, 3212 Bedford Ave. 11210, all of Brooklyn, N.Y.
Filed Jan. 30, 1967, Ser. No. 612,632
Int. Cl. G08b *13/08;* B60r *25/10*
U.S. Cl. 340—274                 11 Claims

ABSTRACT OF THE DISCLOSURE

A protective alarm system which sounds an alarm in a mobile or stationary installation when a door is opened by an intruder after the system is armed. The systems are installed completely within the protected enclosure such as a vehicle, store, office or the like. No externally located activating switches are required. Two combinations of coded switches are provided at a control console of the system. One combination involves a correct code which must be actuated to arm and disarm the system. The other combination involves an incorrect code. Closing of any one of the switches of the incorrect code sounds the alarm. The system can be set for selective operation by opening only certain doors.

---

The invention concerns a protective alarm system especially adapted for vehicular protection, but also adapted for protecting any suitable enclosure such as a home, office, store and the like.

Heretofore protective alarm systems for vehicles have generally required installation of an externally located switch which had to be closed by a key or otherwise in order to arm or alert the system. Installation of such an external switch generally required drilling of a hole or holes in the body of the vehicle. In addition to being unsightly, the exposed switch was subject to tampering so that the armed system could be deactivated by unauthorized persons. Other objections to prior systems were: complex installation which made it difficult or impossible to transfer them from one vehicle to another; a tendency to run down the battery of the vehicle by continually blowing a horn after the system was triggered by an intruder; lack of provision for arming or alerting the system by the driver of the vehicle while inside the vehicle; lack of versatility, i.e. the inability to serve for protectng enclosures other than vehicles, etc.

The present invention overcomes the above and other difficulties and disadvantages of prior protective alarm systems, and in addition embodies many improvements of its own. According to the invention, the present system protects a vehicle and its contents from unauthorized entry, theft and vandalism in a variety of circumstances. The system includes a compact attractive console which is easily mounted under the dashboard of a vehicle such as an automobile. This console serves to control all system functions. It includes a coded combination switch arrangement which eliminates the need for an external key switch to arm the system. The system is arranged to protect the battery of the vehicle from unnecessary drain, and to protect an associated siren from unnecessary use and wear. A test meter can be included for indicating operativeness of the system. The system is arranged so that unauthorized opening of any door to the passenger compartment to the trunk or hood, will set off the siren to emit an audible alarm. When the vehicle is parked at a parking lot, the system can be set so that the doors to the passenger compartment can be opened without setting off the alarm, but if the trunk door or hood is opened, the alarm will be sounded at once. The system is arranged so that after it is set by the driver while inside the vehicle, the driver can open any door or doors and leave them open for any desired length of time. Then when the driver closes the open door or doors, the arming of the system is completed and the alarm will be sounded if any door is subsequently opened by an unauthorized person. An authorized person can open a door to the passenger compartment after the system is armed, but he will have to disarm the system in a prescribed way in a predetermined limited time; otherwise the alarm will be set off. The system can be set so that it is always in a partially armed condition. Arming will be completed by simply closing a coded combination of switches whenever the driver is about to leave the vehicle.

If the system is installed in an enclosure other than a vehicle, such as a home, store, office or the like, the system will operate in the same way as if it were in a vehicle. Unauthorized opening of any door will set off the alarm. No external key operated arming switch is required. The system can be set so that certain doors can be opened without sounding the alarm while opening other doors or windows will sound the alarm.

It is therefore a principal object of the invention to provide a novel protective alarm system for a vehicle or other enclosure having one or more doors, the system being adapted to sound an audible alarm when any door is opened after the system is set to an armed condition.

A further object is to provide a protective alarm system of the character described, wherein the system is armed by operations perfomed inside the enclosure.

Another object is to provide a protective alarm system as described, including coded combinations of switches, so that arming of the system is performed by actuating a coded switch combination, and whereby the alarm will be sounded if any switch not in the coded combination, is operated.

Another object is to provide a system as described, wherein the system can be set so that certain doors can be opened without sounding the alarm after the system is armed, while the opening of other doors will sound the alarm at once.

Further objects are to provide a protective alarm system for a vehicle, home or other enclosure, which system is easy to install, transferable to other vehicles or enclosures, relatively safe from tampering and unauthorized operation, conservative in use of battery power, and versatile in its applications and settings.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a perspective view of the control console of the protective alarm system.

FIG. 2 is a plan view partially schematic in form, of a vehicle with the alarm system installed therein.

FIG. 3 is a fragmentary perspective view of the front of an automobile shown provided with a hood operated switch and siren forming parts of the protective alarm system.

FIGS. 4 and 5 are diagrams of two electrical or electronic circuits which may be used in the protective alarm system.

Referring first to FIGS. 1 and 2, the control console 10 includes a rectangular box 12 containing controls of the system. The box 12 is partially enclosed in a cover or hood 14 which can be attached to the dashboard 16 of an enclosure such as the body of automobile 15. The console 10 has a front panel 18 supporting at its lower left corner a key operated main power switch 20 designated MAIN POWER KEY SWITCH. The switch is shown in OFF position and is turned to ON or operating position by inserting a key in lock 22 and turning the key clockwise. The key can then be removed, leaving the switch in the ON position. Just above switch 20 is a signal light or lamp 24 designated ACTIVE. At the upper right corner of the panel 18 is a signal light or lamp 25 designated RESTING. Just below lamp 25 is a normally closed key operated switch 28 designated PARKING LOT KEY SWITCH. This switch can be set to OPEN position and the key can then be removed from lock 29. Between switches 20 and 28 is a horizontal row of switches 30 having operating buttons 32 and designated respectively #1–#5. Just below switches 30 is a single switch 34 having an operating button 33 for manually operating siren 36 of the system. This switch is designated MANUAL SIREN. Just above switches 30 is a meter 38. This electrical test meter is used to indicate operativeness of the system, in a manner described below.

FIGS. 2 and 3, show siren 36 along with a hood operated push button type of switch 40 located at the front of the automobile 15 in hood compartment 39 just under the hood 41. Switch 40 has an operating button 42 extended upwardly for operation when the hood is opened or closed. The siren and hood switch will be normally concealed by the hood 41 when closed.

Each of the doors 45 to the passenger compartment 46 of the vehicle is provided with a pushbutton type of switch 48 operated by the door when it is opened and closed. There may be two, four or more doors. Another switch 50 is located under the trunk door 51 in trunk compartment 52. This switch is operated when the trunk door 51 is opened or closed. The switches and siren are connected by wires 53 to an armored cable 54 which extends out of the console 20. The console is mounted on dashboard 16 indicated by dotted lines in FIG. 2. The console 10 is located to the left of steering wheel 55 at the driver's position. Battery 56 in the hood compartment 39 is connected to the console via a fuse 58.

FIG. 4 shows circuit 100 which can be used as part of the protective alarm system. This circuit has battery 56, which is generally the battery normally provided in an automobile, connected at negative terminal 57 to ground and at positive terminal 59 through fuse 58 to siren 36, to one terminal of manually operable pushbutton switch 34 and one terminal of key operated switch 20. The other terminal of the siren 36 is connected to contact 101 of normally open SIREN CONTROL relay 102. One terminal of the relay coil 103 is grounded and is also connected to contact 104 of relay 102. The MANUAL SIREN switch 34 is connected via a resistor 106 to the relay coil 103. When the switch 34 is closed, relay 102 becomes energized, contacts 101, 104 of the relay close and the siren is energized. The siren is thus sounded independently of the MAIN POWER KEY SWITCH 20 which remains open. When switch 34 is released, it opens; the power supply circuit of the siren opens, and the siren is turned off. Thus the siren can be sounded in an emergency at any time by pressing switch button 33 while switch 20 is open.

Switch 20 has one terminal connected to contact 108 normally closed with contact 110 in thermal time delay RESET relay 112. Contact 110 is connected to anode 114 of the silicon controlled output SCR rectifier 116. Cathode 118 of rectifier 116 is connected to relay coil 103. When rectifier 116 is fired in a manner to be described by application of a suitable voltage to gate 120 of the rectifier, a direct current path is completed from the battery to the relay coil 103. The relay 102 becomes energized and the siren also becomes energized and is sounded. Filament 122 of the time delay RESET relay 112 is connected in parallel with relay coil 103 so that this relay begins heating (or timing) as soon as relay 102 is energized. After a predetermined heating time, the normally closed contacts 108, 110 of relay 112 open, removing positive battery voltage from the anode 114 of the rectifier 116. This turns off the rectifier, deenergizes relay coil 103, shutting off the siren, and permitting the filament 122 of time delay relay 112 to cool.

When the OUTPUT SCR rectifier 116 is energized in a manner to be descirbed, it passes direct current to relay coil 103. Closing the MANUAL SIREN switch 34 also passes direct current to this coil. Suppose resistor 106 were not present. Then if switch 34 were closed while the OUTPUT SCR rectifier 116 was already energizing the relay coil 103 (because for example, an intruder had entered the vehicle and had pressed the button 33 of switch 34), this would place equal positive potential on both anode and cathode of the rectifier 116 turning it off and preventing the siren from sounding. The resistor 106 which is present in series with switch 34 maintains enough of a potential difference across the rectifier 116 to maintain it in a fired state even if switch 34 is accidentally or deliberately closed. Were it not for the presence of the resistor 106 in the circuit, an intruder would be able to shut off the alarm quickly merely by pressing switch button 33 while the siren would sound.

The hood and trunk switches 40, 50 are normally open when the hood and truck doors are closed. They are wired in parallel with certain ones of the switches 30. In this particular example, switches #1, #3 and #5 are the are the so-called INCORRECT CODE switches and are shown connected in parallel with switches 40, 50. The remaining switches #2 and #4 are shown connected in series. Switches #2 and #4 constitute in this instance the so-called CORRECT CODE combination. One side 107 of the parallel circuit including switches 40, 50, and #1, #3, #5 is connected to the positive terminal of the battery in a series circuit including the relay contacts 108, 110 and MAIN POWER KEY SWITCH 20. If any one of these parallel connected switches is colsed while switch 20 is closed, positive voltage is applied to the gate 120 of rectifier 116 via a resistor-capacitor (R-C) circuit 125 including resistor 126 and capacitor 127 in parallel. This causes the rectifier 116 to fire and become conductive causing siren control relay 102 to become energized, whereupon the siren 36 is energized and is sounded. Once it is fired, the rectifier 116 remains fired and conductive even though the positive voltage applied at gate 120 may be removed by closing the hood or trunk to open the closed switch 40 or 50, or by releasing the button of the incorrect code switch #1, #3 or #5. The SIREN CONTROL relay 102 will remain energized through the fired conductive rectifier 116 and the siren will continue sounding until positive battery voltage is removed from anode 114 to deenergize rectifier 116 and relay 102.

The door switches 48 are normally open when the doors of the automobile are closed. They are all connected in parallel. One side of this parallel arrangement of switches is connected to the positive terminal 59 of battery 56 through the main power key switch 20. When any one of switches 48 is closed while switch 20 is closed positive battery voltoge is carried through the normally closed PARKING LOT KEY SWITCH 28 and resistor-capacitor circuit 130 to gate 132 of the ACTIVE SCR silicon controlled rectifier 134. The switch 28, when open permits the operator of the automobile to disable the door switches 48, while leaving switches 40 and 50 active to protect the hood and trunk. The resistor-capacitor circuits 125 and 130 protect the associated gates 120 and 132 of rectifiers 116, 134 from voltage overload.

R-C circuit 130 has resistor 133 and capacitor 135 in parallel.

When any door switch 48 is closed, it passes positive battery voltage to the gate 132 of rectifier 134, but positive voltage must also be present at the anode 136 of rectifier 134 in order for this rectifier to fire and be rendered conductive. The anode 136 of rectifier 134 is connected to the positive battery terminal 59 through an NPN transistor 140. When base 141 of this transistor is positive, the transistor conducts and applies positive battery voltage to the anode 136 of rectifier 134. Suppose that the base 141 is electrically positive. When a door switch 48 is closed, the positive voltage applied to the gate 132 of the ACTIVE SCR rectifier 134 causes it to fire and remain fired and conductive. This completes a direct current path to the ACTIVE lamp 24 causing it to light, and to the heater or filament 142 of the ACTIVE thermal time delay relay 144 causing it to begin timing. After a predeterimned time, the normally open contacts 145, 146 of relay 144 will close. This completes a positive voltage path to the gate 120 of OUTPUT SCR rectifier 116 through R-C network 125, causing the siren control relay 102 to become energized and consequently the siren to sound. Once lamp 24 lights the operator must press the CORRECT CODE switches or turn off MAIN POWER KEY SWITCH 20 before relay 144 heats up fully.

The base 141 of transistor 140 is connected to one terminal of a low impedance parallel arrangement of RESTING lamp 25 and filament 148 of the thermal time delay relay RESTING relay 150. This relay has normally closed contacts 151, 152. Contact 152 is connected to the other terminal of the lamp 25 and filament 148. Contact 151 is connected to one terminal of each of switches 40, 48, 50. The base 141 of the transistor is thus connected to the positive terminal 59 of the battery 56 through lamp 25 and the normally closed contacts of the time delay relay 150. Although positive voltage reaches the transistor through the filament 148 and the filament of lamp 25 very little current will pass to the transistor base. Thus the RESTING lamp 25 will not light nor will the filament 148 be heated.

One terminal of series arrangement of CORRECT CODE switches 30, switches #2 and #4, is connected to the positive terminal of the battery through normally closed RESET relay contacts 108, 110 and switch 20. When the buttons of the CORRECT CODE switches are pressed simultaneously a positive voltage path is completed to gate 156 of the silicon controlled rectifier 160, designated RESTING SCR, via R-C circuit 162. This causes rectifier 160 to fire. Circuit 162 consists of resistor 164 and capacitor 166 in parallel. Firing of rectifier 160 places the base 141 of transistor 140 at ground potential because the anode 167 and cathode 168 of the rectifier 160 are connected in series with the base 141 to ground. Firing of the rectifier 160 also turns on the RESTING lamp 25 since it is now provided with a ground return path through the rectifier. Also the firing of rectifier 160 starts heating of the filament 148 of the RESTING time delay relay 150 since the filament is now provided with a ground return path through the rectifier.

After a predetermined time, the normally closed contacts 151, 152 of the RESTING time delay relay 150 will open, thus turning off the RESTING SCR rectifier 160. Turning off of rectifier 160 will:

(1) Restore positive voltage at the base 141 of transistor 140, thus permitting this transistor to conduct;

(2) Turn off the RESTING lamp 25; and (3) Cut off heating current from filament 148 of the RESTING time delay relay 150.

From the foregoing, it will be apparent that if hood 41, any door, 45, or trunk door 51 is opened, siren 36 will become energized and will be sounded. There will be a predetermined time delay before the siren sounds if any door 45 is opened, but not if the hood 41 or trunk door 51 is opened. After a short time, contacts 108, 110 of the RESET time delay relay 112 will open and turn off the siren. Upon cooling of the relay 112, however, the contacts of the relay 112 will return to the normally closed position. The cooling of the relay 112 will take a predetermined time. If the open door 45, hood 41 or trunk door 51 is still open, the siren will soon be reactivated automatically. This on-off cycle will continue until the open door, hood or trunk is closed, in which case the last cycle will complete itself and then the alarm will shut off and reset itself.

The four steps in the arming procedure of the system will now be described. The operator will insert a key in lock 22 of switch 20 and turn it to ON position. This is the first step in arming the system. He may now remove the key. Suppose the operator now opens one of the doors 45. This will close one of the normally open switches 48. This is the second step in arming the system. The ACTIVE lamp 24 will now light indicating that the alarm will sound in a few seconds unless the CORRECT CODE switches are operated or the key switch 20 is again turned off. The operator will then press buttons 32 of the CORRECT CODE switches 30. This the third step in arming the system. The RESTING lamp 25 will now light indicating that the proper switches have been operated and the siren is inactivated for a predetermined time, generally set at sixty seconds. Once the door is open the operator can take as long as desired to get out, unload the automobile or do other tasks before closing the door. The alarm will not be fully activated until the open door is shut. The operator then closes the open door. This is the fourth step in arming the system. Now the system is armed and alert to intercept an intruder. If any door 45 should be opened by an unauthorized person, the siren will sound in a few seconds, generally set at fifteen seconds. If the hood or trunk is opened the siren will be activated immediately without any delay time.

When the operator returns to the vehicle and opens any door 45, the ACTIVE lamp 24 will light. The key must be inserted in lock 22 and switch 20 must be turned OFF during the ensuing delay time, generally set at fifteen seconds. If the key is not used at once, the CORRECT CODE combination switches 30 can be closed. Buttons of these switches must be pressed simultaneously to be effective. This will allow an additional sixty seconds to turn off switch 20 before the siren sounds.

If the operator or any one else opens the hood or trunk after the system is armed the siren will sound immediately. To prevent the siren from sounding, the key switch 20 will have to be turned off before the hood or trunk is opened.

If the vehicle is to be parked at a parking lot or garage, access to the interior of the vehicle may be desired for attendants at the lot or garage. However, they will generally have no need to open the hood or trunk. The operator will set the PARKING LOT KEY SWITCH 28 to OPEN position. This will enable any of doors 45 to be opened without sounding the siren, but the siren will sound at once if the hood 41 or trunk door 51 is opened.

If an intruder should open the hood or trunk door at any time after the system is armed, the siren will sound at once. If the intruder should open any door 45 after the system is armed, he will have a predetermined time to set switch 20 to OFF position, otherwise the siren will sound. If the intruder does not have the key to lock 22 and does not know the CORRECT CODE combination, he may press any one or more of switches 30 at random hoping to strike the correct code combination to delay sounding of the siren. However, if he presses a button of any one of the INCORRECT CODE switches the siren will sound at once. Thus even if the intruder accidentally also closes any one of the CORRECT CODE switches, he cannot circumvent the system, because momentary closing any of the INCORRECT CODE switches (#1, #3 and #5 in this example) causes the siren to sound. The chances of an intruder's closing the CORRECT CODE switches and only these switches on the first attempt is very small indeed.

Keyless operation of the system is practical and possible by setting switch 20 to the ON position and leaving it there. Then each time the operator leaves or enters the vehicle, it is only necessary to press the CORRECT CODE buttons simultaneously to prevent the siren from sounding.

In the event of an emergency of any kind, the operator can sound the siren by pressing button 33 of the MANUAL SIREN switch 32. The siren goes off when the switch button is released. If the key switch 20 is in ON position, it is only necessary to press any one of the INCORRECT CODE switches, whereupon the siren will sound at once.

The alarm system can be tested by noting the reading of meter 38. When entering or about to leave the vehicle, the meter reading can be noted while the ACTIVE lamp 24 is lighted and before the CORRECT CODE buttons are pressed. If no reading is obtained, or if a lesser reading than a predetermined one is obtained, a faulty condition of the alarm system will be indicated. The meter 38 operates in this way because as noted in FIG. 4, it is connected in series with filament 142 of the ACTIVE time delay relay 144.

It will be observed that the drain on the battery 56 is minimized since the siren is operated only while the RESET relay 112 is deactivated and contacts 108, 110 are closed. This relay heats up and cools off cyclically as explained above.

FIG. 5 shows another circuit 200, which generally serves the same but slightly different purposes as circuit 100, and operates in a similar manner, and with some different components. Parts of circuit 200 corresponding to those of circuit 100 and performing substantially the same functions have identical legends and primed numbers.

The negative terminal 57' of battery 56' is grounded. The positive terminal 59' is connected via fuse 58' to MAIN POWER KEY SWITCH 20' to terminal 201 of MANUAL SIREN SWITCH 34'. This switch is now a double pole switch with one contact 202 grounded and contacts 203, 204 movable by switch button 33'. The positive terminal 59' is also connected to contact 206 of OUTPUT relay 208. This relay has a coil 209 and two contacts 206, 207 normally open with respect to contacts 210, 212. The positive terminal 59' is also connected to contact 152' of the RESTING thermal time delay relay 150' and to filament 148'. Contact 152' is normally closed with contact 151' of the relay 150'.

When the key switch 20' is closed or turned to ON position, positive battery voltage reaches one end of coil 209 of relay 208 through the normally closed contacts 108', 110' of RESET thermal time delay relay 112'. Contact 108' of the relay is connected to the key switch 20'. The other end of coil 209 is connected to the parallel arrangement of hood and trunk switches 40', 50'. This other end of coil 209 is grounded through either of switches 40' or 50' if the hood or trunk is opened to close the associated switch. When the other end of coil 209 is thus grounded, the OUTPUT relay 208 is energized and the normally open contacts 206, 210 close. This energizes the siren 36' which will then sound the alarm. Simultaneously the other set of open contacts 207, 212 will close and will complete a relay holding circuit 215 to "lock in" the relay 208 and keep the siren sounding. As a result of this locking or holding feature, a grounding of relay 208 occurs by opening the hood or trunk even momentarily and results in sounding the siren.

The hood and trunk switches are connected in parallel with each other and with the INCORRECT CODE switches, in this example shown as switch combination #1, #2 and #4 of the coded switches 30'. One side of the parallel combination is connected to relay coil 209 and the other side of the parallel combination is grounded. Thus if any one of the INCORRECT CODE switches or one of the hood and trunk switches is closed, the OUTPUT relay 208 is activated and the siren is energized and sounded.

Filament 122' of the RESET relay 112' is connected in parallel with the siren. When the siren has sounded for a predetermined length of time, the normally closed RESET time delay relay contacts 108', 110' will open. This deenergizes the OUTPUT relay 208 and turns off the siren.

The door switches 48' are connected in parallel and complete a circuit to ground when any one of the doors 45' shown in FIG. 2 is opened. The ground path is carried through the normally closed PARKING LOT KEY SWITCH 28', to one end of the parallel circuit consisting of:

(a) coil 216 of ACTIVE relay 220;
(b) filament 142' of the ACTIVE thermal time delay relay 144';
(c) ACTIVE lamp 24'.

Completion of a ground path to this parallel circuit activates the ACTIVE relay 220, starts heating the ACTIVE time delay relay 144' and lights the ACTIVE lamp 24' at the control console. The positive battery voltage is applied via the MAIN POWER KEY SWITCH 20', the normally closed contacts 108', 110' of RESET time delay relay 112', and normally closed contacts 225, 226 of RESTING relay 230. Once the ACTIVE relay 220 is energized its normally open contacts 227, 228 close and lock this relay in energized condition. After a predetermined time, the normally open contacts 145', 146' of the ACTIVE time delay relay will close, connecting one end of OUTPUT relay coil 209 to ground. This energizes the siren and locks in the OUTPUT relay as explained above.

The CORRECT CODE combination in this example includes switches #3 and #5 of the coded switches 30'. Switches #3 and #5 are connected in series to ground. By closing these two switches simultaneously a ground return is provided for the parallel circuit consisting of the RESTING relay coil 231 and the RESTING lamp 25' located at the panel of the control console. This parallel circuit is connected to the positive terminal 59' of the battery through the normally closed contacts 151', 152' of the RESTING time delay relay 150'. Consequently, closing the CORRECT CODE switches energizes the RESTING relay 230 and lamp 25'. One set of normally closed contacts 225, 226 of the RESTING relay 230 will open, breaking the positive voltage circuit to the filament 142' of the ACTIVE time delay relay 144' and deenergizing the ACTIVE relay 220. Simultaneously another set of contacts 240, 242 of the RESTING relay 230 will close a holding circuit and lock in the RESTING relay. The same set of contacts 240, 242 will place a ground return on the filament 148' of the RESTING time delay relay 150' and allow it to begin timing. After a predetermined time, the normally closed contacts of the RESTING time delay relay 150' will open. This will deenergize the RESTING relay 230 by removing positive battery voltage from coil 231, and will turn off the RESTING lamp 25'. Deenergizing the RESTING relay 230 also closes the positive battery voltage path via contacts 225, 226 to the ACTIVE time delay relay 144' allowing it to heat up.

After the ACTIVE time delay relay 144' completes its timing cycle, the siren 36' will be energized and will begin sounding as explained above. The siren will continue sounding for a predetermined length of time, determined by the RESET time delay relay 112', and then the siren will shut off. The shut-off time will be equal to the predetermined cooling-off time of the filament 122', if the open hood or trunk door is left open. However, if the open hood or trunk door is closed, then the siren will sound only for the length of time that the RESET time delay relay 112' operates, and then the siren will shut off, while the relay 112' resets itself.

The MANUAL SIREN switch 34' should be operated only when the MAIN POWER KEY SWITCH 20' is turned off. One set of contacts 201, 203 is connected to the OUTPUT relay coil 209 and the other contacts 202, 204 connect to ground and ground the other end of coil 209. Thus the siren is energized while switch 34′ is manually closed.

It will be apparent that basic operation of the circuit 200 is essentially the same as previously described for circuit 100. An important difference in circuitry is the replacement of solid state components such as transistor and silicon controlled rectifiers used in circuit 100. A significant difference in operation is that the siren will be turned on a predetermined time after one of the door switches 48′ is closed by opening one of doors 45. Thus after the operator of the vehicle has momentarily closed the CORRECT CODE switches and has opened the door of the vehicle he has a certain time determined by the heating time of the RESTING time delay relay 144′ to close the door. When he does close this open door the system remains in an armed condition and the siren will in a few seconds sound if any door 45 is again opened without prompt subsequent opening of key switch 20′ or pressing the CORRECT CODE switches. Of course if an intruder opens any door 45 and closes any of the INCORRECT CODE switches, the siren will sound at once. Similarly the siren will sound at once if the hood or trunk door is opened.

The circuit 100 may provide somewhat more reliable operation since it avoids the use of electromagnetic relays such as employed in circuit 200 for ACTIVE, RESTING AND OUTPUT functions. Nevertheless for some installations use of such relays may be desirable.

It will be apparent that a larger number of switches 30 or 30′ can be used than the five shown in the drawing, and that greater or lesser numbers of individual combinations and sequences of switches can be used for the CORRECT and INCORRECT CODE combinations.

Either circuit 100 or 200 can be used in the system if installed in a stationary enclosure such as a home, office, store and the like.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A protective alarm system for an enclosure having at least one door, said system comprising: an electrically operable audible alarm device; a power supply connected in circuit with the alarm device for energizing and sounding the same; a main power switch connected in said circuit to pass power to the alarm device when the switch is closed; a first time delay means connected in circuit with said switch and said alarm device to start a first timing cycle when said switch is initially closed, and for activating the alarm device at the end of said timing cycle; a plurality of coded switches connected in circuit with said time delay means to stop said timing cycle and prevent activating the alarm when the switches are operated before the expiration of said timing cycle; second time delay means connected in circuit with the coded switches power supply and alarm device and arranged to start a second timing cycle when the coded switches are operated, and to activate the alarm at the end of the second timing cycle; a normally open door switch associated with said door and arranged to close when the door is opened; circuit means connecting said door switch in circuit with the second time delay means to stop the second timing cycle provided that the door is opened a first time following the operation of the coded switches and before the expiration of the second timing cycle, whereby the alarm device will remain deactivated as long as the door remains open, and whereby the alarm device will remain deactivated when the open door is subsequently closed; further circuit means connecting said door switch in circuit with the first time delay means to repeat said first timing cycle when the door is opened a second time, whereby the alarm device will be activated upon the expiration of the repeated first timing cycle following the second opening of the door unless the coded switches are again operated before the expiration of the repeated first timing cycle; and another plurality of coded switches connected in circuit with said alarm device for immediately sounding said alarm when any one of the other coded switches is operated following the second opening of the door and while the main power switch is closed.

2. A protective alarm system as defined in claim 1, further comprising another switch connected in circuit with said door switch for deactivating the same so that the door can be opened and closed without causing activation of the alarm device.

3. A protective alarm system as defined in claim 2, wherein said enclosure has another door, and wherein said system further comprises another door switch associated with said other door and connected in circuit with said alarm device for activating the same immediately and independently of the first and second time delay means and of all the coded switches when said other door is opened while the main power switch is closed.

4. A protective alarm system as defined in claim 1, further comprising third time delay means connected in circuit with the alarm device and arranged to cut off power from the alarm device cyclically while the main power switch is on and power is being applied to the alarm device, so that the alarm device repeatedly sounds and is silenced for times determined by the timing of the third time delay means.

5. A protective alarm system as defined in claim 1 further comprising signal lamps respectively connected in circuit with the first and second time delay devices to light respectively during the timing cycles of the first and second time delay means.

6. A protective alarm system as defined in claim 1, further comprising a control console, said main power switch and said first and second coded switches being carried by said console in a position for selective operation by an operator of the system.

7. A protective alarm system as defined in claim 1, further comprising normally nonconductive gated devices connected in circuit with the first and second time delay devices respectively for passing electric current to the same when each of said gated devices is triggered to conductive condition.

8. A protective alarm system as defined in claim 7, wherein each of said gated devices is a silicon controlled rectifier, and wherein each of the time delay devices is a thermal time delay relay having a heating filament, each of the rectifiers having a cathode and anode connected in series with said filament, one of said rectifiers having a gate connected in circuit with said coded switches and the other of said rectifiers having a gate connected in circuit with the door switch.

9. A protective alarm device as defined in claim 5, further comprising a first electromagnetic relay having contacts connected in circuit with one of the signal lamps and with the first time delay device to keep the said one lamp energized during the first timing cycle, and a second electromagnetic relay having contacts connected in circuit with the other signal lamp and with the second time delay device to keep the same energized during the second timing cycle.

10. A protective alarm system as defined in claim 5, further comprising a meter connected in circuit with the first time delay device for indicating operativeness of the same during the first timing cycle.

11. A protective alarm system as defined in claim 1, wherein each of the time delay devices is a thermal time delay relay having an electrically heated filament and contacts heated by the filament to actuate the contacts, said filaments having certain heating and cooling off times for timing the first and second timing cycles.

References Cited

UNITED STATES PATENTS

| 2,964,733 | 12/1960 | Raju | 340—276 X |
|---|---|---|---|
| 3,024,452 | 3/1962 | Leonard | 340—274 |
| 3,058,092 | 10/1962 | Johnson | 340—64 |
| 3,074,049 | 1/1963 | Saliba et al. | 340—276 X |
| 3,200,393 | 8/1965 | Worley | 340—276 |
| 3,422,398 | 1/1969 | Rubin | 340—276 X |

JOHN W. CALDWELL, Primary Examiner

J. M. BOBBITT, Assistant Examiner

U.S. Cl. X.R.

340—63